Patented Dec. 6, 1938

2,139,621

UNITED STATES PATENT OFFICE 2,139,621

PREPARATION OF GUANYL-UREA SULPHONIC ACID

Hans Z. Lecher, Plainfield, and Alan E. Pierce, Bound Brook, N. J., assignors to The Calco Chemical Company, Inc., Bound Brook, N. J., a corporation of Delaware No Drawing. Application July 12, 1937, Serial No. 153,278

14 Claims. (Cl. 260—125)

This invention relates to new and improved methods of producing guanyl urea N-sulphonic acid.

Guanyl urea N-sulphonic acid, sometimes referred to as dicyandiamidine sulphonic acid, has been prepared by the dehydration of guanyl urea sulphate by heating with acetic anhydride in the presence of small amounts of zinc acetate. The reaction is as follows:

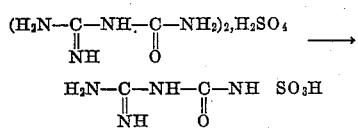

The formula for guanyl urea sulphonic acid is generally accepted though the constitution has not been definitely proved and it is possible, though unlikely, that the sulphonic group may be attached to a different nitrogen atom.

The method just described is expensive because of the waste of acetic anhydride, a relatively expensive dehydrating agent, and because of the fact that only one molecule of guanyl urea N-sulphonic acid is produced from two molecules of guanyl urea present in the original sulphate. The unsulphonated molecule reacts with acetic anhydride giving various reaction and decomposition products so that the real yield at best is not more than 50% based on the guanyl urea sulfate used. An additional disadvantage of the prior art lies in the fact that the guanyl urea N-sulphonic acid formed is not entirely stable to acetic anhydride at higher temperatures. This results in further undesirable side reactions and greatly increases the consumption of acetic anhydride. The sulphonic acid obtained is also not pure and is of yellow color unless further purified, which entails additional expense.

According to the present invention guanyl urea sulphate is dehydrated by means of acid halides, such as acid chlorides and acid bromides. Any unconverted guanyl-urea for the most part forms the corresponding hydrohalide of guanyl urea and therefore can be readily recovered and reused. The separation of the guanyl urea N-sulphonic acid formed from the hydrohalide of guanyl urea and from the small amount of other by-products formed is relatively easy because the by-products including the hydrohalide of guanyl urea are soluble in water while the sulphonic acid is only sparingly soluble in water at ordinary temperature. It is thus a simple matter to obtain sulphonic acid with an excellent over-all yield in an entirely colorless form.

The invention is not limited to any particular acid halide. Excellent results are obtainable with sulphur mono- and dichloride (which may be considered as the acid chlorides of $S_2(OH)_2$ and sulphoxylic acid respectively), thionyl chloride, sulphuryl chloride, phosphorus trichloride, phosphorus tribromide, phosphorus oxychloride, arsenious chloride, silicon chloride, stannic chloride, phosgene.

The acid halides may be reacted directly with the guanyl urea sulphate without using any diluent. In such a case any unreacted acid halide may be distilled off when the reaction is completed or the insoluble sulphonic acid and insoluble by-products may be filtered off. Better results, however, are obtained by working in the presence of inert diluents such as for example chlorbenzene or symmetrical tetrachlorethane. When using an inert diluent the amount of acid halide can be greatly reduced, almost to the amount theoretically required in the reaction. This is of great importance as the consumption of acid halide represents the major cost of the process.

The process of the present invention is not particularly sensitive to temperature although in each case an optimum temperature or temperature range will be noted. This temperature or temperature range will vary to some extent depending on the particular acid halide employed. Thus for example when thionyl chloride is used without a diluent, a temperature of 79° C. is adequate for thorough dehydration. On the other hand, when only a slight excess of thionyl chloride is used diluted with chlorbenzene, a much higher temperature, for example 120°–132° C., gives better results. In general, the temperature or temperature range is from 60°–160° C. and should not exceed 170° C. because above this temperature the guanyl urea sulphate tends to undergo decomposition in a different manner with the production of undesired products.

The guanyl urea N-sulphonic acid is useful for the stabilization of aromatic diazo compounds to be used in admixture with coupling components for printing.

The invention will be described in greater detail in conjunction with the following specific examples, but it should be understood that the invention is not limited to the particular temperatures therein set forth. The parts given in the examples are parts by weight.

Example 1

16 parts of hydrated guanyl urea sulphate are mixed with 240 parts of thionyl chloride and boiled with agitation under reflux. The boiling is continued until evolution of hydrogen chloride has ceased; whereupon the solid material is separated from the liquid. The solid contains a mixture of guanyl urea N-sulphonic acid and guanyl urea hydrochloride and is treated with water, which dissolves the guanyl urea hydrochloride leaving behind the guanyl urea N-sulphonic acid, which is only slightly soluble in water at ordinary temperatures. The mixture is filtered and the precipitate constitutes pure guanyl urea N-sulphonic acid. The filtrate may then be treated with sufficient sulphuric acid to transform the guanyl urea hydrochloride into guanyl urea sulphate, which can then be recovered by concentrating the filtrate.

*Example 2*

Hydrated guanyl urea sulphate is dried for two days at 100° C. producing anhydrous guanyl urea sulphate. 30.2 parts of the anhydrous product is mixed with 15.2 parts of thionyl chloride and 165 parts of chlorbenzene is then boiled under reflux and further treated as described in Example 1. A pure guanyl urea N-sulphonic acid is obtained and guanyl urea sulphate can be recovered. This modification reduces the consumption of thionyl chloride.

Instead of chlorbenzene a corresponding amount of symmetrical tetrachlorethane may be used, the process being otherwise the same. Guanyl urea N-sulphonic acid of excellent purity is obtained.

*Example 3*

30.2 parts of anhydrous guanyl urea sulphate are mixed with 17 parts of sulphuryl chloride and 165 parts of chlorbenzene and the mixture treated as described in Example 1, producing guanyl urea N-sulphonic acid of excellent purity and permitting recovery of guanyl urea sulphate for reuse.

*Example 4*

30.2 parts of anhydrous guanyl urea sulphate are mixed with 17 parts of sulphur monochloride and 165 parts of chlorbenzene and the mixture treated as described in Example 1. Guanyl urea N-sulphonic acid is obtained and guanyl urea sulphate is recovered for reuse.

*Example 5*

30.2 parts of anhydrous guanyl urea sulphate are mixed with 9.7 parts of phosphorus oxychloride and 165 parts of chlorbenzene and the mixture treated as described in Example 1. Pure guanyl urea N-sulphonic acid is obtained.

*Example 6*

30.2 parts of anhydrous guanyl urea sulphate are mixed with 165 parts of chlorbenzene, stirred and heated to a gentle boil while phosgene is passed thereinto, until substantially no more gas is absorbed. The solid formed is treated as described in Example 1 and pure guanyl urea N-sulphonic acid is obtained.

What we claim is:

1. A method of preparing guanyl urea N-sulphonic acid which comprises heating at 60 to 160° C. guanyl urea sulphate is the presence of sulphur monochloride.

2. A method of preparing guanyl urea N-sulphonic acid which comprises heating at 60 to 160° C. guanyl urea sulphate in the presence of sulphuryl chloride.

3. A method of preparing guanyl urea N-sulphonic acid which comprises heating at 60 to 160° C. guanyl urea sulphate in the presence of thionyl chloride.

4. A method of producing guanyl urea N-sulphonic acid which comprises heating at 60 to 160° C. guanyl urea sulphate in the presence of sulphur monochloride and chlorbenzene.

5. A method of producing guanyl urea N-sulphonic acid which comprises heating at 60 to 160° C. guanyl urea sulphate in the presence of sulphuryl chloride and chlorbenzene.

6. A method of producing guanyl urea-N-sulphonic acid which comprises heating at 60 to 160° C. guanyl urea sulphate in the presence of thionyl chloride and chlorbenzene.

7. A method of producing guanyl urea N-sulphonic acid which comprises heating at 60°–160° C. guanyl urea sulphate in the presence of an inorganic acid chloride, separating out the solid formed and treating the solid with water followed by filtration whereby pure solid guanyl urea N-sulphonic acid is obtained.

8. A method according to claim 7 in which the filtrate is treated with sulphuric acid to transform the guanyl urea hydrochloride into guanyl urea sulphate which is recovered from the mother liquor by concentration.

9. A method according to claim 7 in which the heating takes place in the presence of an inert diluent and the solid material is removed by filtration.

10. A method of preparing guanyl-urea-N-sulphonic acid which comprises heating guanyl-urea sulphate in the presence of an inorganic acid halide at 60–160° C.

11. A method of preparing guanyl-urea-N-sulphonic acid which comprises heating guanyl-urea sulphate in the presence of a substance included in the group consisting of inorganic acid chlorides and bromides at 60–160° C.

12. A method of preparing guanyl-urea-N-sulphonic acid which comprises heating guanyl-urea sulphate in the presence of an inorganic acid chloride at 60–160° C.

13. A method of producing guanyl-urea-N-sulphonic acid which comprises heating guanyl-urea sulphate in the presence of an inorganic acid halide and an inert diluent at 60–160° C.

14. A method of producing guanyl-urea-N-sulphonic acid which comprises heating guanyl-urea sulphate in the presence of an inorganic acid halide and chlorobenzene at 60–160° C.

HANS Z. LECHER.
ALAN E. PIERCE.